3,256,349
PRODUCTION OF ALLYL CHLORIDES
Herwig Freyschlag, Werner Reif, and Horst Pommer, Ludwigshafen (Rhine), Germany, assignors to Badische Anilin- & Soda-Fabrik Aktiengesellschaft, Ludwigshafen (Rhine), Germany
No Drawing. Filed May 7, 1963, Ser. No. 278,744
Claims priority, application Germany, May 12, 1962, B 67,222
4 Claims. (Cl. 260—648)

This invention relates to the production of allyl chlorides from allyl alcohols with allyl rearrangement. More specifically, the invention relates to the production of allyl chlorides with uniform configuration from allyl alcohols.

By prior art methods, allyl chlorides are prepared from the corresponding allyl alcohols by interaction with chlorinating agents, such as hydrogen chloride, phosphorus chlorides or thionyl chloride. If the allyl alcohol used does not contain substituents attracting electrons on the α-carbon atom bearing the OH group, the product obtained is a mixture of the allyl chloride whose structure corresponds to that of the allyl alcohol used, and the isomeric allyl chloride formed by allyl rearrangement. Thus, for example, a mixture of 2-butenyl chloride-(1) and 1-butenyl chloride-(3) is obtained in the chlorination of 2-butenol-(1) with thionyl chloride. It is known that in the reaction of allyl alcohols with thionyl chloride in dilute ethereal solutions, the isomeric allyl chloride formed by rearrangement is obtained as the sole reaction product if the solution is used in a concentration not higher than 1-molar. At higher concentrations or when using other solvents, however, mixtures of isomeric allyl chlorides are obtained. A mixture of allyl chlorides is also obtained from allyl alcohols when phosgene is used as the chlorinating agent.

It is an object of the present invention to provide a process for the production of allyl chlorides from allyl alcohols in which allyl chlorides having uniform configuration are obtained by allyl rearrangement. It is another object of this invention to provide a process for the production of unitary allyl chlorides from allyl alcohols in which allyl chlorides are obtained in better than the conventional yields. A further object of the invention is to provide a process for the production of allyl chlorides of uniform configuration in commercial scale operation. These and other objects and advantages of the invention will hereinafter be described in greater detail.

We have found that an allyl chloride having the general formula:

in which each of the radicals $R^1$ to $R^5$ denotes a hydrogen atom or an alkyl group, alkenyl group, aralkyl group or cycloalkyl group, or $R^1$ and $R^2$ and also $R^3$ and $R^4$ in pairs denote alkylene groups, and wherein the pair $R^1$ and $R^2$ is different from the pair $R^3$ and $R^4$ is obtained exclusively by interacting an allyl alcohol having the general formula:

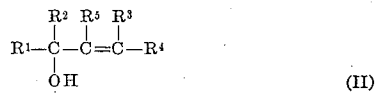

in which $R^1$ to $R^5$ have the above meanings, with thionyl chloride or phosgene, in the presence of an N,N-dialkyl substituted amide of a low molecular weight alkane carboxylic acid or an N-alkyl substituted lactam.

The essential advantage of the process in accordance with the present invention over the prior art technique using ether as a solvent consists in the fact that other solvents which lend themselves better for commercial scale manufacture may as well be used and that the process can be carried out at considerable higher concentrations.

The process may generally be used with all olefinically unsaturated alcohols having allyl structure and containing no functional groups which will react with phosgene or thionyl chloride other than the hydroxyl group. The process, however, has particularly efficiency with compounds having formulae in which structurally different compounds are reflected when the pair of substitutents $R^1$ and $R^2$ is exchanged with the pair of substitutents $R^3$ and $R^4$.

Preferred allyl alcohols having the general Formula I which are to be used as initial materials are those in which $R^1$ to $R^5$ denote hydrogen, alkyl groups having one to twenty carbon atoms, alkenyl groups having three to twenty carbon atoms, aralkyl groups having seven to ten carbon atoms, cycloalkyl groups having five to twelve carbon atoms, or, in pairs, alkylene groups having three to eleven carbon atoms, and in which the pair $R^1$ and $R^2$ is different from the pair $R^3$ and $R^4$. The process acquires special importance when $R^3$, $R^4$ and $R^5$ denote hydrogen.

Examples of allyl alcohols of the general Formula II preferred in the practice of the process according to this invention are 2-butenol-(1), 1-butenol-(3), 2-methyl-3-butenol-(2), 2-methyl-2-butenol-(1), 1 - vinylcyclohexanol, linalool, 2-phenylethylvinyl carbinol, cyclohexylvinyl carbinol, 2,6,10,14-tetramethylhexadecen-(15) - ol - (14) (= isophythol), dodecylvinyl-carbinol, 2,3,6-trimethyl-5-ethylhepten-(3)-ol-(5), 2,2,4-trimethyl-5-tert.butylhepten-(4)-ol-(5), 3-methyloktadecen-(1)-ol-(3), 4-methyloktadiene-(3,7)-ol-(5), 4-nonadien-(3,7)-ol-(5), 2,6-dimethyl-3-methylenehepten-(5)-ol-(2), vinylcyclo octanol and phenylethylmethylvinyl carbinol.

Preferred N,N-dialkyl substituted low molecular weight alkane carboxylic amides are those having one to six carbon atoms in each alkyl radical. The preferred N-alkyl lactams are those having five to thirteen ring members (four to twelve carbon atoms in the ring) and one to four carbon atoms in the N-alkyl radical.

Examples of efficient N,N-dialkyl substituted low molecular weight alkane carboxylic amides and of N-alkylated lactams are N-N-dimethylformamide, N,N-diethylformamide, N,N-dimethylacetamide, N,N-dibutylpropionamide, N-methylpyrrolidone and N-ethylcaprolactam.

In the practice of the present invention a mixture of the allyl alcohol and the carboxylic amide or lactam is placed in a reactor together with a suitable solvent and then phosgene is passed in, or thionyl chloride slowly added, at room temperature. It is also possible, however, to add the allyl alcohol component to a mixture of the carboxylic amide with the chlorinating agent. In general the process is carried out at about room temperature. In some cases it has been found advantageous to operate at low temperatures, for example at −30° C., or at higher temperatures, for example at 100° to 120° C. The allyl chloride formed may be isolated from the reaction mixture by adding water, separating the organic phase, evaporating the solvent and fractionating the residue, if this is liquid.

Suitable solvents are saturated aliphatic or aromatic hydrocarbons and chlorinated hydrocarbons having a boiling point of 20° to 250° C., e.g. hexane, octane, benzene, toluene, xylene, chloroform, tetrachloromethane or monochlorobenzene. The solvent may be used in an amount which may vary within wide limits, i.e. up to multimolar solutions, for example 10-molar solutions of the allyl alcohol. For economical reasons, however, it is not advantageous to use solutions with less than 5% of allyl alcohol. When liquid allyl alcohol is used the process may also be carried out without the use of a solvent. The chlorinating agent is advantageously used in a slight molar excess with reference to the allyl alcohol. In the usual case molar ratios of 1:1 to 1:3 are maintained. The N-substituted carboxylic amides or N-alkylated lactams are preferably added in amounts of 0.01 to 1 mole per mole of chlorinating agent, but larger amounts may also be user, the acid amide then being used as a solvent. As in the case of an extraneous solvent, however, an excess of more than twenty times is uneconomical.

The process is usually carried out at atmospheric pressure or slightly increased pressure, for example up to 3 atmopheres gauge, at which the phosgene is fed in. In some cases, for example when readily volatile solvents are used, it is advantageous, however, to work in an autoclave, for example up to 50 atmospheres.

The majority of the compounds obtainable by the process according to this invention are known compounds which can be used as intermediates, for example for syntheses of foodstuff dyes, perfumes or plant protection products. Those among the compounds which are new can be used for the same purposes as the known homologs.

The following examples will further illustrate the invention, the parts being by weight.

*Example 1*

240 parts of phosgene is passed into a solution of 175 parts of dimethylformamide in 870 parts of benzene at $+5°$ to $+10°$ C. 252 parts of 1-vinylcyclohexanol is slowly added at room temperature and the mixture stirred for another hour. The reaction mixture is then poured onto ice and the organic layer separated. The solvent is evaporated and the residue rectifier. 230 parts of 1-cyclohexylidene-2-chloroethane having the boiling point $90°$ to $92°$ C. at 23 mm. Hg are obtained; $n_D^{20} = 1.4942$.

*Example 2*

308 parts of linalool of the formula

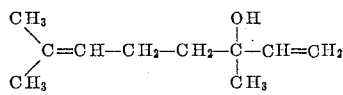

is added at room temperature to a mixture of benzene, dimethylformamide and phosgene prepared as described in Example 1. The mixture is stirred for another hour and the reaction mixture then poured into ice-water. After separating the organic layer and removing the solvent by distillation the residue is rectified, 267 parts of geranyl chloride:

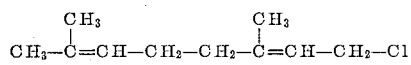

having the boiling point $79°$ to $80°$ C. at 2.5 mm. Hg being obtained.

*Example 3*

120 parts of phosgene is passed at $+5°$ to $+10°$ C. into a solution of 120 parts of N-methylpyrrolidone in 650 parts of methylene chloride. After adding 86 parts of 2-methyl-3-butenol-(2) at room temperature the mixture is stirred for another hour. The reaction mixture is poured onto ice and the organic layer is separated. After removing the solvent by evaporation the residue is rectified, 66 parts of 1-chloro-3-methyl-butene-(2) having the boiling point $105°$ to $107°$ C. at 760 mm. Hg being obtained; $n_D^{20} = 1.4462$.

*Example 4*

143 parts of thionyl chloride is added to a solution of 86 parts of 2-methyl-3-butenol-(2) and 88 parts of N,N-dimethyl formamide in 650 parts of methylene chloride in such a way that the temperature does not rise above $+25°$ C. The mixture is stirred for another three hours at room temperature and further processed as in Example 3, 56 parts of 1-chloro-3-methylbutene-(2) being obtained.

*Example 5*

120 parts of phosgene is passed at $0°$ to $+10°$ C. into a solution of 88 parts of N,N-dimethyl formamide in 670 parts of toluene. A solution of 176 parts of (1-phenylethyl)-methylvinyl carbinol in 200 parts of toluene is added slowly at room temperature and the mixture stirred for another two hours. It is then poured onto ice and the organic layer is separated. According to infrared analysis the toluene solution contains 134 parts of 1-chloro-3-methyl-5-phenyl-pentene-(2), which may be carried to further reaction in this solution without previous isolation.

*Example 6*

A solution of 140 parts of cyclohexylvinyl carbinol in 200 parts of toluene is added, at room temperature, to a mixture of toluene, dimethyl formamide and phosgene prepared as in Example 5. The mixture is stirred for two hours and then poured into ice-water. The organic layer is separated. As may be determined by infrared analysis, the product contains 118 parts of 3-cyclohexyl-allyl chloride which can be further reacted in this solution without previous isolation.

We claim:

1. A process for the production of an allyl chloride having the formula

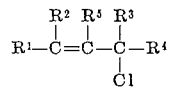

in which $R^1$ to $R^5$ denote a member selected from the group consisting of hydrogen, alkyl with 1 to 20 carbon atoms, alkenyl with 3 to 20 carbon atoms, aralkyl with 7 to 10 carbon atoms, cycloalkyl with 5 to 12 carbon atoms and in pairs denote alkylene groups with 3 to 11 carbon atoms, the pair $R^1$ and $R^2$ being different from the pair $R^3$ and $R^4$ which, comprises contacting a chlorinating compound selected from the group consisting of thionyl chloride and phosgene with an allyl alcohol of the formula

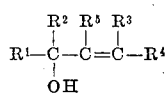

in which $R^1$ to $R^5$ have the above meanings, at a temperature of between $-30°$ and $120°$ C., in the presence of a compound selected from the group consisting of N,N-dialkyl substituted amides of a low molecular alkanecarboxylic acid, said alkyl groups each having 1–6 carbons, and N-alkyl substituted lactams having 5–13 ring members and 1–4 carbons in the N-alkyl group, the reaction being carried out in a solvent selected from the group consisting of an excess of said amides and said lactams, and as an inert solvent liquid, saturated aliphatic hydrocarbons, liquid aromatic hydrocarbons, and liquid chlorinated hydrocarbons, said inert solvent having a boiling point in the range of $20°$ C. to $250°$ C.

2. A process as claimed in claim 1 wherein said amide is dimethylforamide.

3. A process for the production of an allyl chloride having the formula

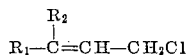

in which $R_1$ and $R_2$ each denote alkyl with 1 to 20 carbon atoms which comprises contacting a chlorinating compound selected from the group consisting of thionyl chloride and phosgene with an allyl alcohol of the formula

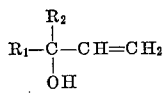

in which $R_1$ and $R_2$ have the above meanings, at a temperature of between $-30°$ and $120°$ C., in the presence of a compound selected from the group consisting of N,N-dialkyl substituted amides of a low molecular alkanecarboxylic acid, said alkyl groups each having 1–6 carbons, and N-alkyl substituted lactams having 5–13 ring members and 1–4 carbons in the N-alkyl group, the reaction being carried out in a solvent selected from the group consisting of an excess of said amides and said lactams, and as an inert solvent liquid, saturated aliphatic hydrocarbons, liquid aromatic hydrocarbons, and liquid chlorinated hydrocarbons, said inert solvent having a boiling point in the range of 20° C. to 250° C.

4. A process for the production of an allyl chloride having the formula

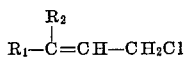

in which $R_1$ denotes alkenyl with 3 to 20 carbon atoms and $R_2$ denotes alkyl with 1 to 20 carbon atoms which comprises contacting a chlorinating compound selected from the group consisting of thionyl chloride and phosgene with an allyl alcohol of the formula

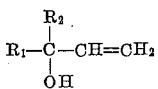

in which $R_1$ and $R_2$ have the above meanings, at a temperature of between $-30°$ and $120°$ C., in the presence of a compound selected from the group consisting of N,N-dialkyl substituted amides of a low molecular alkanecarboxylic acid, said alkyl groups each having 1–6 carbons and N-alkyl substituted lactams having 5–13 ring members and 1–4 carbons in the N-alkyl group, the reaction being carried out in a solvent selected from the group consisting of an excess of said amides and said lactams, and as an inert solvent liquid, saturated aliphatic hydrocarbons, liquid aromatic hydrocarbons, and liquid chlorinated hydrocarbons, said inert solvent having a boiling point in the range of 20° C. to 250° C.

References Cited by the Examiner

UNITED STATES PATENTS 3,038,947    6/1957    Coyner et al. _____ 260—657

FOREIGN PATENTS 1,133,716    7/1962    Germany.

OTHER REFERENCES

DeWolf et al., Chemical Reviews, vol. 56 (August 1956, QD1A563) pp. 813–818.

LEON ZITVER, *Primary Examiner.*

K. V. ROCKEY, *Assistant Examiner.*